(12) United States Patent
Piesinger

(10) Patent No.: US 6,175,301 B1
(45) Date of Patent: Jan. 16, 2001

(54) LOW TIRE PRESSURE WARNING SYSTEM

(76) Inventor: Gregory H. Piesinger, 6225 E. Saguaro Vista Ct., Cave Creek, AZ (US) 85331

( * ) Notice: Under 35 U.S.C. 154(b), the term of this patent shall be extended for 0 days.

(21) Appl. No.: 09/272,473

(22) Filed: Mar. 19, 1999

(51) Int. Cl.[7] ............................. B60C 23/00; B60C 23/02
(52) U.S. Cl. ........................ 340/442; 340/445; 340/447; 73/146.4; 116/34 R
(58) Field of Search ..................... 340/442, 447, 340/445, 446, 146.8; 73/146.2, 146.3, 146.4, 146.5; 116/34 R; 200/61.22

(56) References Cited

U.S. PATENT DOCUMENTS

| | | | |
|---|---|---|---|
| 4,507,956 | * 4/1985 | Schlesinger et al. | 73/146.5 |
| 5,285,189 | * 2/1994 | Nowicki et al. | 340/447 |
| 5,559,484 | * 9/1996 | Nowicki et al. | 340/447 |
| 5,619,022 | 4/1997 | Long | 200/83 P |
| 5,637,926 | * 6/1997 | Zedonis | 307/10.1 |
| 5,694,111 | 12/1997 | Huang | 340/442 |
| 5,708,411 | * 1/1998 | Hill | 340/447 |
| 5,717,135 | 2/1998 | Fiorletta et al. | 73/146.5 |
| 5,717,376 | * 2/1998 | Wilson | 340/442 |
| 5,731,754 | * 3/1998 | Lee, Jr. et al. | 340/447 |
| 5,754,102 | 5/1998 | Yanase | 340/442 |
| 5,774,048 | 6/1998 | Achterholt | 340/447 |
| 5,781,104 | 7/1998 | Huang | 340/442 |
| 5,798,689 | * 8/1998 | Huang | 340/447 |
| 5,819,779 | 10/1998 | Takemura et al. | 137/229 |
| 5,838,229 | * 11/1998 | Robinson, III | 340/442 |
| 5,853,020 | 12/1998 | Widner | 137/227 |
| 5,856,619 | 1/1999 | Wang | 73/146.5 |
| 5,900,808 | * 5/1999 | Lebo | 340/442 |
| 5,929,755 | * 7/1999 | Hsieh | 340/442 |

* cited by examiner

*Primary Examiner*—Jeffrey A. Hofsass
*Assistant Examiner*—Toan Pham

(57) ABSTRACT

A low tire pressure warning system includes a tire pressure sensor constructed to be mounted within each of the tires on the wheels of a vehicle. Each tire pressure sensor includes a pressure switch coupled to a transmitter and a battery, with the pressure switch being constructed to connect the battery to the transmitter so as to activate the transmitter when pressure within the tire drops below a low value. A receiver is constructed to be mounted within the vehicle in communication with the transmitters and a low tire pressure warning indicator is coupled to the receiver so as to be activated when the receiver receives a signal from any one of the transmitters.

16 Claims, 3 Drawing Sheets

LOW TIRE PRESSURE WARNING SYSTEM

FIELD OF THE INVENTION

This invention relates to a warning system for indicating low tire pressure on a vehicle.

More particularly, the present invention relates to a wireless warning system for indicating low tire pressure on a vehicle.

In a further and more specific aspect, the instant invention concerns the use of a micropower transmitter in a warning system for indicating low tire pressure on a vehicle.

BACKGROUND OF THE INVENTION

This disclosure describes a wireless low-tire-pressure warning system for use on trailers, cars, trucks, and other vehicles. Although wireless tire pressure monitor systems are currently in use, they are fairly expensive and are typically only available as an original equipment option on new cars and trucks.

The available wireless tire pressure systems are typically sophisticated systems in that they measure and give a continuous readout of the actual pressure in each tire. Although this is a nice feature, it is not required simply to warn the driver of a hazardous condition. These extra features increase the complexity and cost of the system.

There have been numerous patents issued on tire pressure monitoring systems. However, most of the older patents describe mechanically complicated systems or systems that can only be installed as original equipment when the vehicle is manufactured. The newer patents typically describe wireless systems designed to display the tire's actual air pressure to the driver.

The primary challenge of electronic tire pressure monitors is battery life. It is easy to design a full featured unit inside the tire that measures and transmits actual tire pressure. However, to provide these features requires considerable battery current to operate the electronic pressure sensors that are typically used to measure air pressure in the tire. To conserve battery life, these units are typically designed to only transmit tire pressure periodically. To save battery power, some systems only provide pressure updates once a minute. This is a severe limitation in that a fast tire leak might not be detected for nearly a mile when traveling at highway speeds. A tire could completely deflate and disintegrate over this distance before the driver is alerted.

It would be highly advantageous, therefore, to remedy the foregoing and other deficiencies inherent in the prior art.

Accordingly, it is an object of the present invention to provide a new and improved low tire pressure warning system.

Another object of the invention is to provide a new and improved low tire pressure warning system which is easy to install in the tires of vehicles presently being used, as well as in new vehicles.

And another object of the invention is to provide a new and improved low tire pressure warning system which is relatively inexpensive.

Still another object of the present invention is to provide a new and improved low tire pressure warning system with a very long operating life because of low battery drain.

Yet another object of the invention is to provide a new and improved low tire pressure warning system which gives an operator instant notification of low tire pressure.

SUMMARY OF THE INVENTION

Briefly, to achieve the desired objects of the instant invention in accordance with a preferred embodiment thereof, a low tire pressure warning system is provided that includes a tire pressure sensor constructed to be mounted within each of the tires on the wheels of a vehicle. Each tire pressure sensor includes a pressure switch coupled to a transmitter and a battery, with the pressure switch being constructed to connect the battery to the transmitter so as to activate the transmitter when pressure within the tire drops below a low (generally normal) value. A receiver is constructed to be mounted within the vehicle in communication with the transmitters and a low tire pressure warning indicator is coupled to the receiver so as to be activated when the receiver receives a signal from any one of the transmitters.

In a preferred embodiment, a low tire pressure warning system in accordance with the present invention includes a tire pressure sensor constructed to be mounted within a tire on a wheel of a vehicle. The tire pressure sensor includes a pressure switch coupled to a transmitter and a battery, and the pressure switch is constructed to connect the battery to the transmitter so as to activate the transmitter when pressure within the tire drops below a low (generally normal) value. The transmitter includes an oscillator for producing a carrier and a pseudo random noise generator connected to the oscillator for modulating the carrier. A receiver is constructed to be mounted within the vehicle in communication with the transmitter for receiving the carrier. The receiver includes a pseudo random noise generator similar to the pseudo random noise generator in the transmitter for decoding only valid pseudo random noise coded signals transmitted by the transmitter, and a low tire pressure warning indicator is coupled to the receiver so as to be activated when the receiver receives a signal from the transmitter.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENT

A goal of the present invention is to design a simple very-low-cost system that will be easy to install and will instantly provide the vehicle operator a warning whenever the air pressure of a tire falls below a predetermined low or normal level. The system is designed to provide an idiot light warning for low tire pressure much like the low cost alternator and oil pressure warning light indicators. The system is a simple one in that the operator is not provided an air pressure reading or even an indication of which tire is low. Rather, the driver is simply given a sound and/or a flashing light warning which indicates that the air pressure in one of the tires has fallen below the preset level. The driver then identifies which tire is low either by visually looking at it or by measuring the pressure in each tire using a tire pressure gauge.

Although this product will be useful to car and truck operators, it will be especially useful to motorists who tow boat, horse, and travel trailers. When towing a trailer, it is very difficult for the driver to realize that a tire has gone flat in a timely manner. This is also true on many types of cars and trucks. In many cases, the flat tire condition may not be detected until the tire is damaged or it starts to shed rubber. Shedding rubber is an especially hazardous condition when it occurs on a trailer tire.

Figure 1:
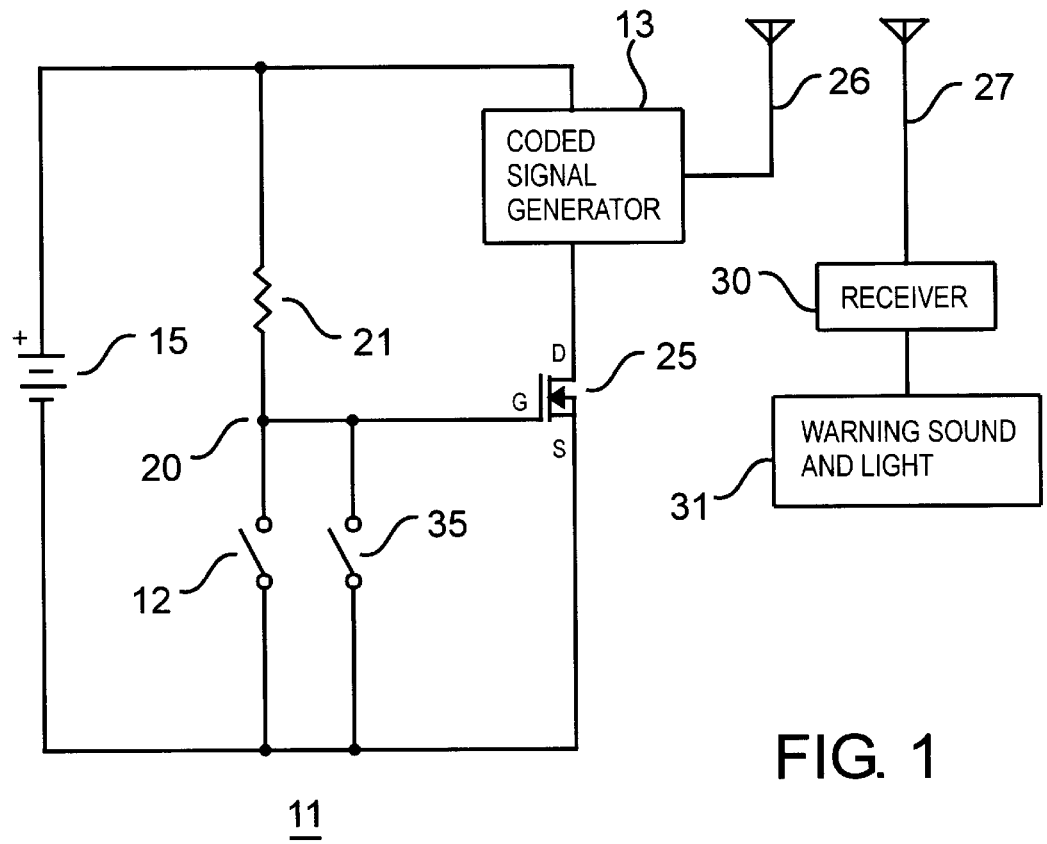
FIG. 1 is a block/schematic diagram of a low tire pressure warning system in accordance with the present invention.

Turning now to the drawings in which like reference characters indicate corresponding elements throughout the several views, attention is first directed to FIG. 1, which illustrates a block/schematic diagram of a low tire pressure warning system 10 in accordance with the present invention. Low tire pressure warning system 10 includes a tire pressure sensor 11 constructed to be mounted within a tire on the wheel of a vehicle (illustrated in FIG. 5), Tire pressure sensor 11 includes a pressure switch 12 coupled to a transmitter 13 and a battery 15. As will be explained presently, pressure switch 12 is constructed to couple battery 15 to transmitter 13 so as to activate transmitter 13 when pressure within the tire drops below a predetermined low or normal value.

The positive terminal of battery 15 is connected to a junction 20 through a high resistance, which in this preferred embodiment is a 10 megohm resistor 21. The negative terminal of battery 15, which acts as a common terminal, is coupled to junction 20 through pressure switch 12, when pressure switch 12 is closed. Junction 20 is connected to the gate terminal of a field effect transistor (FET) 25 and the source terminal of FET 25 is connected to the negative terminal of battery 15. Transmitter 13 is connected between the positive terminal of battery 15 and the drain terminal of FET 25. In the normal or deactivated mode (pressure switch 12 closed), the gate of FET 25 is held at the potential of the negative terminal of Battery 15 and it is biased into an OFF mode. No power is applied to transmitter 13 and no signals are transmitted. In the OFF mode very little current is drained from battery 15 because of the very high resistance (10 megohm resistor 21) in the circuit. In this mode the life of battery 15 is approximately the same as its normal shelf life (generally about 10 years). While pressure switch 12 is normally closed in this preferred embodiment, it should be noted by those skilled in the art that a normally open pressure switch along with the circuitry required to utilize this opposite mode of operation can be easily devised in view of this disclosure.

When the pressure within the tire drops below the predetermined low or normal value, pressure switch 12 is allowed to open. In this mode, the gate of FET 25 is raised to approximately the potential of battery 15 and FET 25 is turned ON, which activates transmitter 13 and a carrier is applied to a transmission antenna 26. The carrier is transmitted from antenna 26 to a receiving antenna 27 conveniently positioned in the a area. A receiver 30 is constructed to be mounted within the vehicle and a low tire pressure warning indicator 31 is coupled to receiver 30 so as to be activated when receiver 30 receives a signal from transmitter 13. Receiver 30 is constructed to be mounted in any convenient location, depending upon whether low tire pressure warning system 10 is included in the vehicle as o original equipment or is added later. Low tire pressure warning indicator 31 also may be mounted in any convenient location and may included a warning light and/or a warning sound of some selected type.

An optional reed switch 35 is mounted in parallel with pressure switch 12 and is positioned in tire pressure sensor 11 so t hat it will close when an external magnet (not shown) is held next to tire pressure sensor 11. Reed switch 35 can be used to en sur e that tire pressure sensor 11 remains off prior to mounting it inside a tire, e.g. while in storage or in a store, etc.). A small magnet taped to the outside of tire pressure sensor 11 near reed switch 35 will cause reed switch 35 to close, thus removing power from the circuit when pressure switch 12 is o pen. The magnet will be removed during installation of tire pressure sensor 11 into the tire. Alternatively, reed switch 35 could be eliminated and one or more low tire pressure sensors 11 can be shipped in bulk in a pressurized container.

Figure 2:
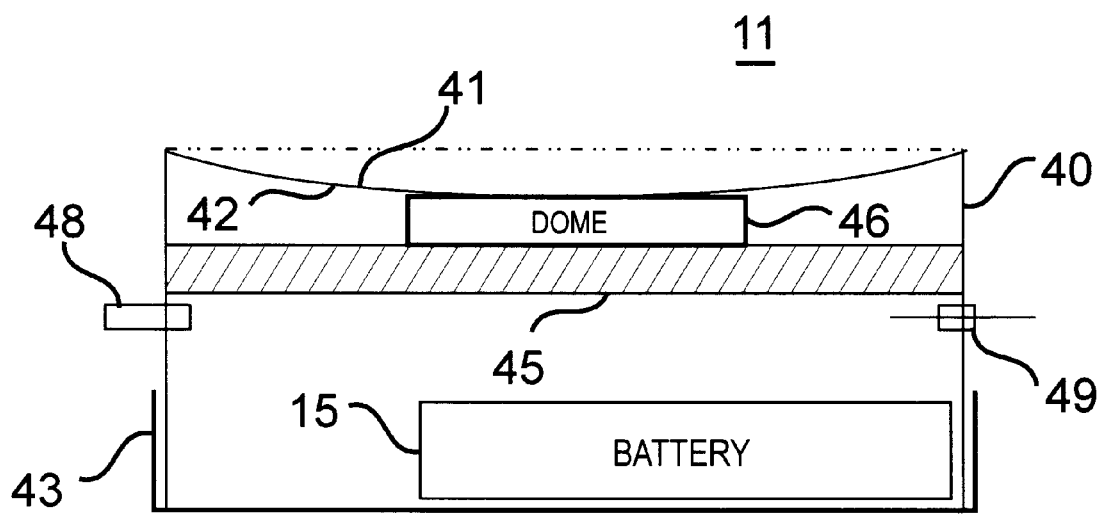
FIG. 2 is a sectional view of the low tire pressure warning system of FIG. 1, in a normal to high tire pressure mode.
Figure 3:
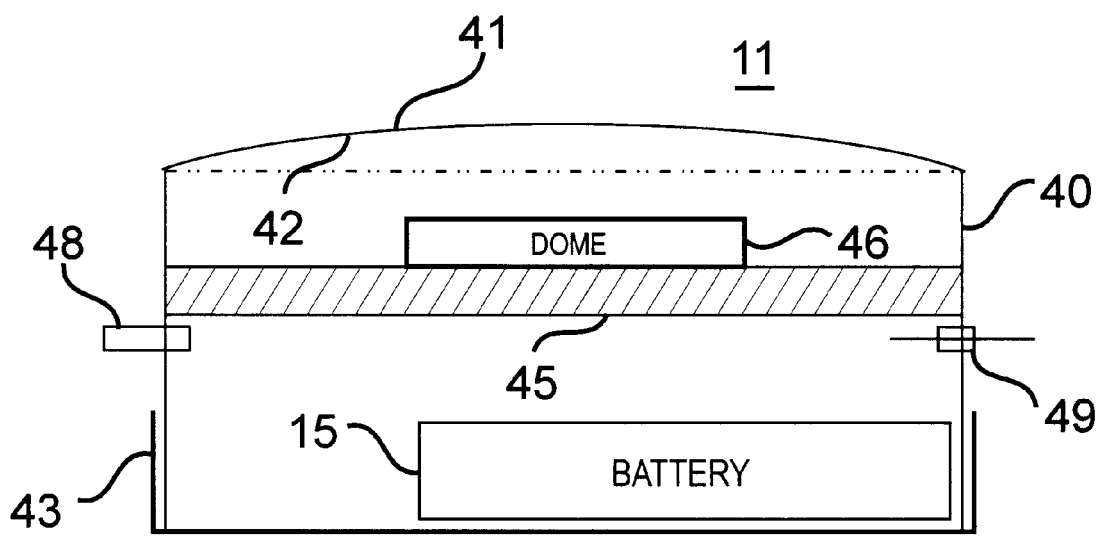
FIG. 3 is a sectional view of the low tire pressure warning system of FIG. 1, in a low tire pressure mode.

One of the keys to low cost in low tire pressure warning system 10 is pressure switch 12. Sensitive pressure switches are typically quite expensive, bulky, and have poor repeatability. The present system eliminates these problems using the sensor structure illustrated in FIGS. 2 and 3. Specifically, FIG. 2 is a sectional view of tire pressure sensor 11 in a normal to high tire pressure mode and FIG. 3 illustrates tire pressure sensor 11 in a low tire pressure mode. Sensor 11 includes a sensor enclosure 40 with a flexible wall 41, with an electrically conductive contact 42 on flexible wall 41. In this preferred embodiment and for convenience in manufacture, sensor enclosure 40 is a metal can with a metal cover 43, which is fixedly attached over sensor enclosure 40 to hermetically seal the structure so that it can be internally pressurized to a predetermined low value, such as normal tire pressure. To form flexible wall 41, either one end of sensor enclosure 40 can be made of thin metal or the entire metal can be made of thin metal. It will of course be understood that only a portion of flexible wall 41 needs to be formed of electrically conductive material to provide contact 42, and the remainder of sensor enclosure 40 and cover 43 can be formed of any convenient material which can maintain an internal pressure to provide the functions of the present invention.

Battery 15 and a circuit board 45, on which is mounted the remaining circuitry of tire pressure sensor 11 and transmitter 13, are mounted in sensor enclosure 40 so that the enclosure itself becomes pressure switch 12. By using sensor enclosure 40 as the pressure switch, the pressure switch is essentially free. That is, a separate expensive pressure switch or sensor component is not required in this design. A dome contact 46 is provided on circuit board 45 as a second contact for pressure switch 12, electrical contact 42 and flexible wall 41 being the other contact. While a variety of electrical contacts can be provided as contact 46, in this preferred embodiment dome contact 46 is a small diameter deep drawn circular can mounted on circuit board 45 with an enclosed end directed toward flexible wall 41. The use of this structure as dome switch 46 forms a broad contact surface with thin flexible wall 41 that can absorb a high contact force when the tire is over inflated. Contacts that are sharp or otherwise present a small area to flexible wall 41 can permanently dent, or even rupture, flexible wall 41 when the external pressure is relatively large (e.g. an over inflated tire).

In this preferred embodiment, sensor enclosure 40 is formed by soldering both halves of an approximately 1.3" diameter deep drawn circular can together. A small diameter fill tube 48 is mounted so as to extend through sensor enclosure 40 so that the completed enclosure can be pressurized to the preset trip point. Fill tube 48 is pinched off and either soldered or brazed shut after pressurization. A hermetic feed through terminal 49 is used to bring out the transmitter signal or carrier. A wire antenna consisting of a short length of thin flexible stainless steel wire will be attached to the output of feed through terminal 49.

In operation, sensor enclosure 40 is pressurized after assembly to the desired preset tire low pressure alarm value. When placed inside a tire inflated to a pressure higher than the pressure inside sensor enclosure 40, the high tire pressure 'oil cans' the thin lid inward, as illustrated in FIG. 2, and holds it tight against dome contact 46, thus closing pressure switch 12 formed by dome contact 46 and flexible wall 41. Closing pressure switch 12 removes bias from FET 25, thus removing power from transmitter 13. If the tire pressure falls below the preset pressure, the now higher pressure inside sensor enclosure 40 causes the thin flexible wall 41 to 'oil can' outward thus opening pressure switch 12. Opening pressure switch 12 applies bias to FET 25 which turns on transmitter 13.

Since flexible wall 41 only has to move on the order of 1 thousands of an inch to open the circuit, pressure switch 12 very accurately opens whenever the pressure in sensor enclosure 40 exceeds the external pressure, e.g. the tire pressure. Pressure switch 12 also has the advantage of low or no hysteresis between open and closed states because no snap action is involved. The temperature stability of pressure switch 12 is also very good in that the air pressure in both the tire and sensor enclosure 40 change together under changing ambient conditions. That is, if the tire heats up, the air pressure in both the tire and sensor enclosure 40 increases. Since the differential pressure across flexible wall 41 does not change, pressure switch 12 does not change states. For instance, suppose pressure switch 12 were set to activate at 25 psi at 75 degrees and the tire then heats up to 150 degrees at highway speeds. Both the tire pressure and the pressure in sensor enclosure 40 would increase but the differential pressure across flexible wall 41 would remain the same. Pressure switch 12 might then operate if the hot tire pressure were to fall below 30 psi. However, this pressure would still accurately represent a low tire pressure condition because when the tire is cooled back down to 75 degrees, the tire pressure would be below the preset pressure of 25 psi.

Figure 4:
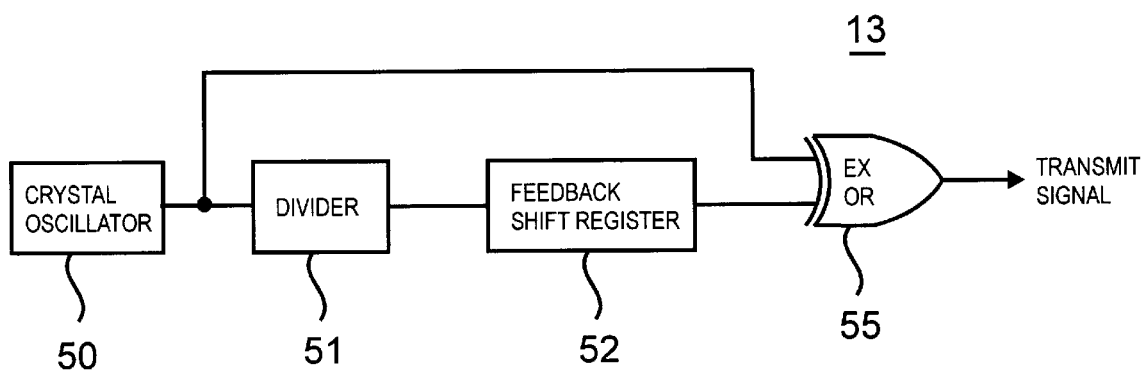
FIG. 4 is a block diagram of a coded signal generator transmitter for use in the low tire pressure warning system of FIG. 1.

Turning now to FIG. 4, a block diagram of a coded signal generator is illustrated that is used as transmitter 13 in this preferred embodiment. While a wide variety of transmitters may be utilized, the embodiment disclosed herein is preferred for a number of reasons that will become apparent as this disclosure proceeds. Transmitter 13 includes an oscillator 50, which in this embodiment is a crystal oscillator because of the stability and simplicity that can be achieved. To achieve micropower transmitter capability and to prevent false alarms, the transmitted signal is formed by modulating the carrier produced by oscillator 50 with a pseudo random noise (PN) code. The modulation is achieved by connecting the carrier from oscillator 50 to a divider 51 and using the output to clock a feedback shift register 52. The output signal from shift register 52 is applied to one input of a two-input exclusive OR gate 55 with the other input being connected to receive the carrier directly from oscillator 50. The modulation is produced by an exclusive OR of the crystal oscillator carrier frequency and the output of the feedback shift register. PN codes of various lengths can be formed by changing the feedback taps as will be known to anyone skilled in the art. Different RF carrier frequencies and PN code modulation bandwidths can be selected by changing the crystal oscillator frequency and divider ratio respectively. Thus, a carrier modulated by a specific PN code is provided as the output of transmitter 13. When activated, the implementation of a coded signal allows a micropower transmitter to be used which can operate continuously for more than a month before draining battery 15.

The use of a crystal controlled signal source eliminates transmitter signal frequency drift with time and temperature and simplifies the receiver design. By using an identical code in receiver 30, only valid PN coded signals from transmitter 13 are properly decoded and activate low tire pressure warning indicator 31. Extraneous pulses or noise signals are eliminated in the detection process and will not activate low tire pressure warning indicator 31. Collapsing the PN code in receiver 30 also provides substantial processing gain and spreads the transmitter energy over a wide bandwidth. A low noise receiver together with this PN code processing gain provides very high sensitivity which allows a very low signal level to be used in transmitter 13. This low signal level requires very little battery power which allows transmitter 13 to operate continuously for a long period of time without draining battery 15. This low signal level and the bandwidth spreading of the PN code also pushes the spectral emissions below regulation limits so that arbitrary transmitter frequencies can be used.

Figure 5:
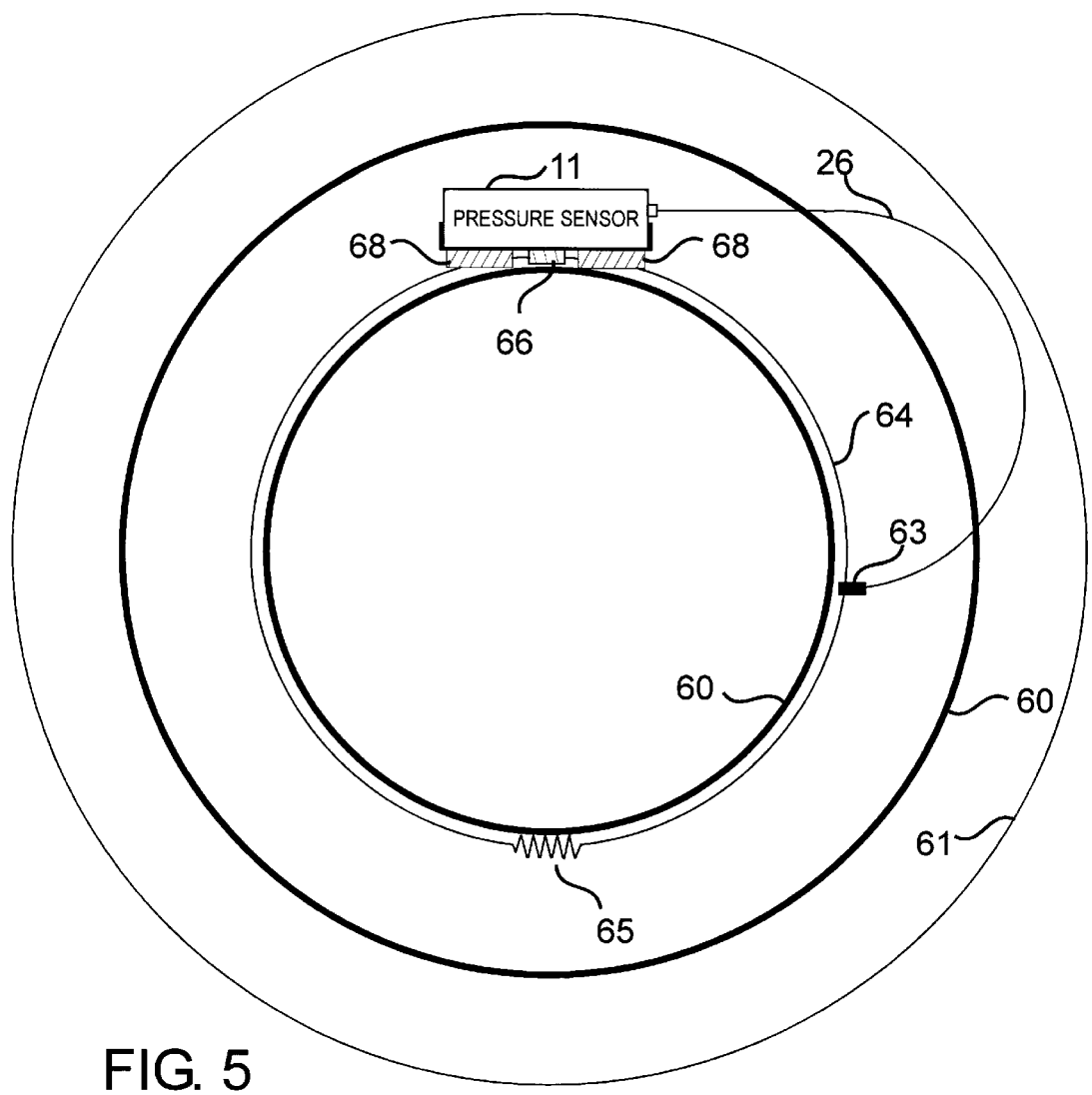
FIG. 5 is a sectional view of a wheel and tire with the low tire pressure warning system of FIG. 1 installed therein.

Another goal of this invention is to make low tire pressure warning system 10 easy to install. A preferred mount and method of mounting tire pressure sensor 11 is illustrated below. A simplified sectional view of a wheel or rim 60 with a tire 61 mounted thereon is illustrated in FIG. 5. To install pressure sensor 11, tire 61 is first removed from rim 60 and pressure sensor 11 is attached to the bottom inside surface of rim 60. Pressure sensor 11 is held to rim 60 by any convenient apparatus as, for example, by using a small diameter wire rope 64 and a tension spring 65. Tension spring 65 is a short stiff spring positioned on the opposite side of rim 60 to hold wire rope 64 taut and to counter balance the weight of pressure sensor 11.

Figure 6:
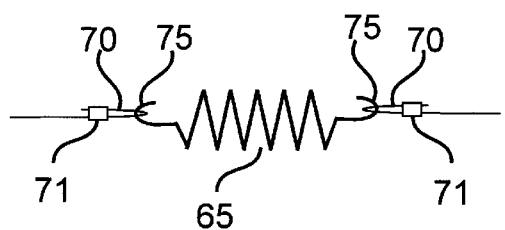
FIG. 6 is an enlarged view of a portion of the mounting apparatus illustrated in FIG. 5.

As illustrated in FIG. 6, a small loop 70 is formed in each end of wire rope 64 using standard compression sleeves 71. Tension spring 65 is connected to wire rope 64 by simply slipping each end loop 70 over the spring end hooks 75. Referring again to FIG. 5, wire rope 64 is threaded through a hollow spacer 66 attached to the bottom side of sensor enclosure 40 of pressure sensor 11. Rubber pads 68 may also be attached to the bottom of sensor enclosure 40 to provide shock absorption and thermal insulation. Tire 61 is then remounted on rim 60 and inflated. It is envisioned that low tire pressure warning system 10 will be installed, for example, at the time new tires are purchased.

In this embodiment, antenna 26 consists of a short length of small diameter stainless steel wire. This type of wire is very springy and will hold its shape indefinitely. Antenna 26 is bent upward slightly so that it extends beyond rim 60 and then curves back downward where it is held in place by short insulated (plastic) tube 63. This allows antenna 26 to rise above the shielding effect caused by metal rim 60 and increases the effective radiated energy to receiver antenna 27. The wire rope 64 passes through plastic tube 63 and holds it firmly in place against rim 60. Receiver antenna 27 (see FIG. 1) is most conveniently formed by simply routing a long length of hookup wire from receiver 30 to the vicinity of the tires. In its simplest form, the hookup wire will be routed along the centerline of the vehicle or trailer from the front to the back. The front end of the hookup wire is attached to receiver 30, generally mounted in the cab, while the back end of the wire will generally be unterminated. The radiated transmitter signal from each pressure sensor 11 in the tires will be received by the hookup wire and conducted to receiver 30.

If a trailer is involved, a connector will be placed between the vehicle and the trailer at the trailer hitch. To improve sensitivity, a single length or individual sections of hookup wire may be routed next to each tire. All the sections are then connected together to form a single connection to receiver 30. Alternatively, in some applications it may be desirable to run each section of hookup wire into receiver 30 and multiplex them together. If each section is only routed close to one of the tires, then the section with the strongest signal will identify the tire with low pressure.

The design of receiver 30 and low tire pressure warning indicator 31 is straight forward and could be easily designed by anyone skilled in the art. Since vehicle battery power is available, current draw is not an issue. In the preferred implementation, the antenna signal will be amplified by a sensitive low noise receiver, analog-to-digital converted, and PN decoded using a digital signal processor. Receiver 30 and low tire pressure warning indicator 31 can be either packaged as a single unit or packaged separately. If packaged separately, the larger receiver 30 can be mounted under the seat or in the engine compartment while a very small low tire pressure warning indicator 31 is mounted in the cab next to the driver. In a preferred embodiment, a pulsating tone and flashing light will be initiated upon receipt of a sensor signal.

Thus, low tire pressure warning system 10 in accordance with the present invention provides instant notification of low tire pressure without the battery life limitation. It does this by using a pressure switch that turns on the system at a preset pressure point. This allows the system to be completely powered down until the tire pressure drops to the preset alarm level. The cab mounted receiver unit detects the presence of the coded signal and activates the warning light and/or the tone. In the simplest implementation, a low pressure in any tire will turn on an associated transmitter and activate the warning signal. If desired, a more sophisticated implementation could be used in which the actual tire with the low pressure is identified. This identification could be provided either by using separate codes for each tire sensor or by placing separate receiver antennas next to each tire. In the later case, the low pressure tire would be indicated by the antenna with the strongest signal. However, both of these techniques lead to higher costs and are not required to simply warn the driver of a hazardous low tire pressure situation.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A low tire pressure warning system comprising:
   a tire pressure sensor constructed to be mounted within a tire on a wheel of a vehicle, the tire pressure sensor including a pressure switch coupled to a transmitter and a battery, and the pressure switch being constructed to connect the battery to the transmitter so as to activate the transmitter when pressure within the tire drops below a low value, the pressure switch and transmitter being located in a sensor enclosure with the pressure switch formed as an integral part of the sensor enclosure, the sensor enclosure hermetically sealed and internally pressurized to the low value;
   a receiver constructed to be mounted within the vehicle in communication with the transmitter; and
   a low tire pressure warning indicator coupled to the receiver so as to be activated when the receiver receives a signal from the transmitter.

2. A low tire pressure warning system as claimed in claim 1 wherein the sensor enclosure includes a flexible wall and the pressure switch includes a fixed electrical contact mounted adjacent an electrically conductive contact on the flexible wall.

3. A low tire pressure warning system as claimed in claim 1 wherein the flexible wall includes an electrically conductive portion formed integrally with the flexible wall.

4. A low tire pressure warning system as claimed in claim 3 wherein the sensor enclosure is a can and the flexible wall is a metal cover.

5. A low tire pressure warning system as claimed in claim 1 wherein the fixed electrical contact includes a metal dome mounted on a circuit board.

6. A low tire pressure warning system as claimed in claim 5 wherein the transmitter is mounted on the circuit board.

7. A low tire pressure warning system as claimed in claim 1 wherein the transmitter includes a coded signal generator.

8. A low tire pressure warning system as claimed in claim 1 wherein the transmitter includes an oscillator for producing a carrier and a pseudo random noise generator connected to the oscillator for modulating the carrier.

9. A low tire pressure warning system as claimed in claim 8 wherein the oscillator is a crystal oscillator.

10. A low tire pressure warning system as claimed in claim 8 wherein the receiver includes a pseudo random noise generator similar to the pseudo random noise generator in the transmitter for decoding only valid pseudo random noise coded signals transmitted by the transmitter.

11. A low tire pressure warning system as claimed in claim 10 wherein the transmitter includes a micropower transmitter.

12. A low tire pressure warning system comprising:
   a tire pressure sensor constructed to be mounted within a tire on a wheel of a vehicle, the tire pressure sensor including a pressure switch coupled to a transmitter and a battery, and the pressure switch being constructed to connect the battery to the transmitter so as to activate the transmitter when pressure within the tire drops below a low value;
   the tire pressure sensor including an internally pressurized sensor enclosure enclosing the pressure switch, the transmitter, and the battery and forming a portion of the pressure switch, the pressure switch including an electrically conductive flexible wall of the enclosure, and a fixed electrical contact mounted adjacent the flexible wall within the sensor enclosure so as to disengage the electrically conductive flexible wall when pressure within the tire drops below the low value and connect the battery to the transmitter, the transmitter being mounted within the sensor enclosure;
   a receiver constructed to be mounted within the vehicle in communication with the transmitter; and
   a low tire pressure warning indicator coupled to the receiver so as to be activated when the receiver receives a signal from the transmitter.

13. A low tire pressure warning system as claimed in claim 12 wherein the transmitter includes a coded signal generator.

14. A low tire pressure warning system as claimed in claim 13 wherein the transmitter includes a micropower transmitter.

15. A low tire pressure warning system comprising:

a tire pressure sensor constructed to be mounted within a tire on a wheel of a vehicle, the tire pressure sensor including a pressure switch coupled to a transmitter and a battery, and the pressure switch being constructed to connect the battery to the transmitter so as to activate the transmitter when pressure within the tire drops below a low value, the transmitter includes an oscillator for producing a carrier and a pseudo random noise generator connected to the oscillator for modulating the carrier, the tire pressure sensor including an internally pressurized sensor enclosure enclosing the pressure switch, the transmitter, and the battery with an electrically conductive flexible wall, and a fixed electrical contact mounted adjacent the flexible wall within the sensor enclosure so as to form the pressure switch and disengage the electrically conductive flexible wall when pressure within the tire drops below the low value and connect the battery to the transmitter;

a receiver constructed to be mounted within the vehicle in communication with the transmitter for receiving the carrier, the receiver including a pseudo random noise generator similar to the pseudo random noise generator in the transmitter for decoding only valid pseudo random noise coded signals transmitted by the transmitter; and a low tire pressure warning indicator coupled to the receiver so as to be activated when the receiver receives a signal from the transmitter.

16. A low tire pressure warning system as claimed in claim 15 wherein the oscillator is a crystal oscillator.

\* \* \* \* \*